(12) United States Patent
Yang

(10) Patent No.: US 11,876,410 B2
(45) Date of Patent: Jan. 16, 2024

(54) ROTOR FOR MOTOR

(71) Applicant: HYUNDAI MOBIS CO., LTD., Seoul (KR)

(72) Inventor: Hae Jun Yang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 98 days.

(21) Appl. No.: 17/370,314

(22) Filed: Jul. 8, 2021

(65) Prior Publication Data

US 2022/0029485 A1    Jan. 27, 2022

(30) Foreign Application Priority Data

Jul. 21, 2020 (KR) .................. 10-2020-0089946

(51) Int. Cl.
*H02K 1/30* (2006.01)
*H02K 1/27* (2022.01)
*H02K 1/276* (2022.01)

(52) U.S. Cl.
CPC .............. *H02K 1/30* (2013.01); *H02K 1/276* (2013.01)

(58) Field of Classification Search
CPC ......... H02K 1/276; H02K 1/30; H02K 1/2766
USPC .................................................... 310/156.08
See application file for complete search history.

(56) References Cited

U.S. PATENT DOCUMENTS

| | | | | |
|---|---|---|---|---|
| 7,279,821 B2* | 10/2007 | Fukushima | .......... | H02K 1/2706 310/156.53 |
| 8,593,029 B2* | 11/2013 | Inoue | .................. | H02K 1/2773 310/263 |
| 9,048,712 B2* | 6/2015 | Lee | .......................... | H02K 1/28 |
| 9,419,482 B2* | 8/2016 | Lee | .......................... | H02K 1/28 |
| 9,484,777 B2* | 11/2016 | Kim | ........................ | H02K 1/276 |
| 9,502,929 B2* | 11/2016 | Yamada | ............... | H02K 21/044 |
| 9,608,485 B2* | 3/2017 | Yamagishi | .......... | H02K 1/2766 |
| 9,667,111 B2* | 5/2017 | Kim | ..................... | H02K 1/2766 |
| 10,270,306 B2* | 4/2019 | Yamada | .................. | H02K 5/04 |
| 10,404,114 B2* | 9/2019 | Sano | ....................... | H02K 1/276 |
| 2005/0285468 A1* | 12/2005 | Fukushima | .......... | H02K 1/2706 310/156.53 |
| 2012/0146336 A1* | 6/2012 | Hori | ......................... | H02K 1/32 310/43 |
| 2012/0187794 A1* | 7/2012 | Inoue | .................... | H02K 21/048 310/181 |
| 2013/0119808 A1* | 5/2013 | Hirokawa | ............ | H02K 1/2773 310/156.43 |
| 2013/0187486 A1* | 7/2013 | Lee | ........................... | H02K 5/02 310/43 |
| 2013/0187506 A1* | 7/2013 | Lee | ........................... | H02K 1/28 310/156.12 |
| 2013/0300242 A1* | 11/2013 | Yamada | ............... | H02K 21/044 310/156.08 |
| 2014/0375162 A1* | 12/2014 | Kim | ...................... | H02K 1/2766 310/156.59 |
| 2018/0198331 A1* | 7/2018 | Sano | ..................... | H02K 1/2766 |
| 2019/0103791 A1* | 4/2019 | Goel | ...................... | H02K 15/03 |
| 2019/0386530 A1* | 12/2019 | Takahashi | ............ | H02K 1/2706 |
| 2020/0169130 A1* | 5/2020 | Kim | ..................... | H02K 1/2786 |

* cited by examiner

*Primary Examiner* — Alex W Mok
(74) *Attorney, Agent, or Firm* — NSIP Law

(57) ABSTRACT

A rotor for a motor includes: a rotor core including accommodation holes penetrating the rotor core in an axial direction; permanent magnets respectively accommodated in the accommodation holes; an endplate configured to cover an end of the rotor core; and a soft magnetic core disposed on the endplate.

19 Claims, 12 Drawing Sheets

ROTOR FOR MOTOR

CROSS-REFERENCE TO RELATED APPLICATIONS

This application claims the benefit under 35 U.S.C. § 119(a) of Korean Patent Application No. 10-2020-0089946 filed on Jul. 21, 2020 in the Korean Intellectual Property Office, the entire disclosure of which is incorporated herein by reference for all purposes.

TECHNICAL FIELD

The present disclosure relates to a rotor for a motor, and more particularly, to a rotor for a motor, which is capable of improving efficiency of the motor and increasing a counter electromotive force of the motor.

BACKGROUND ART

In general, permanent magnet (PM) motors may be classified into a surface mounted permanent magnet (SPM) motor and an interior permanent magnet (IPM) motor depending on structures of rotors, i.e., positions at which permanent magnets are disposed in rotors.

The SPM motor has the permanent magnets disposed on a surface of the rotor, and the IPM motor has the permanent magnets disposed in the rotor.

The advantage of the IPM motor is that in comparison with the SPM motor, the permanent magnets may be easily fixed while the rotor rotates at a high speed, magnetic torque and reluctance torque may be used in combination, and high torque and high efficiency may be implemented by characteristics such as a decrease in eddy current loss on a rotor surface.

In addition, the advantage of the IPM motor is that the amount of use of permanent magnets may be reduced, the shape of the permanent magnet may be simplified, the structure of the motor may be simplified because it is not necessary to provide an anti-withdrawal binder for preventing withdrawal of the permanent magnet, and the number of components may be reduced.

Meanwhile, when magnetic flux leaks in an axial direction of the permanent magnet (an axial direction of the motor) in the PM motor, the efficiency and counter electromotive force of the motor deteriorate. Therefore, it is necessary to minimize the amount of magnetic flux leaking in the axial direction of the permanent magnet.

In the related art, however, the magnetic flux leaks into the air from an end of the permanent magnet in the axial direction of the PM motor, which causes a deterioration in efficiency and counter electromotive force of the motor.

To this end, recently, various types of studies are conducted to minimize the amount of magnetic flux leaking into the air from the end of the permanent magnet, improve efficiency of the motor, and increase a counter electromotive force of the motor, but the study results are still insufficient. Accordingly, there is a need to develop a technology to minimize the amount of magnetic flux leaking into the air from the end of the permanent magnet, improve efficiency of the motor, and increase a counter electromotive force of the motor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a rotor for a motor includes: a rotor core including accommodation holes penetrating the rotor core in an axial direction; permanent magnets respectively accommodated in the accommodation holes; an endplate configured to cover an end of the rotor core; and a soft magnetic core disposed on the endplate.

The soft magnetic core may be disposed between the rotor core and the endplate.

The soft magnetic core may include a single core plate disposed between the rotor core and the endplate.

The core plate may have a ring shape corresponding to the rotor core.

The core plate may include exposure holes through which the permanent magnets are exposed.

The core plate may at least partially cover the accommodation holes.

The soft magnetic core may include a plurality of core pieces disposed between the rotor core and the endplate.

The plurality of core pieces may be disposed to be spaced apart from one another and may cooperatively define a ring shape corresponding to the rotor core.

The permanent magnets may be exposed through gaps between the plurality of core pieces.

The plurality of core pieces may at least partially cover the accommodation holes.

The rotor may further include: a coupling protrusion disposed on the soft magnetic core; and a coupling groove disposed in the rotor core and configured to accommodate the coupling protrusion.

The rotor may further include: a fixing protrusion disposed on the soft magnetic core; and a fixing groove disposed in the endplate and configured to accommodate the fixing protrusion.

An accommodation groove may be disposed in an inner surface of the endplate that faces the rotor core, and the soft magnetic core may be accommodated in the accommodation groove.

A through-hole may be disposed in the endplate, and the soft magnetic core may be accommodated in the through-hole so as to be disposed on a same layer as the endplate.

The endplate may be made of a non-magnetic material.

The soft magnetic core may include a plurality of core pieces. The plurality of core pieces may be respectively accommodated in a plurality of accommodation grooves disposed in an inner surface of the endplate that faces the rotor core. Shapes and a sizes of the plurality of accommodation grooves may respectively correspond to shapes and sizes of the plurality of core pieces.

Other features and aspects will be apparent from the following detailed description, the drawings, and the claims.

DETAILED DESCRIPTION

Figure 1:
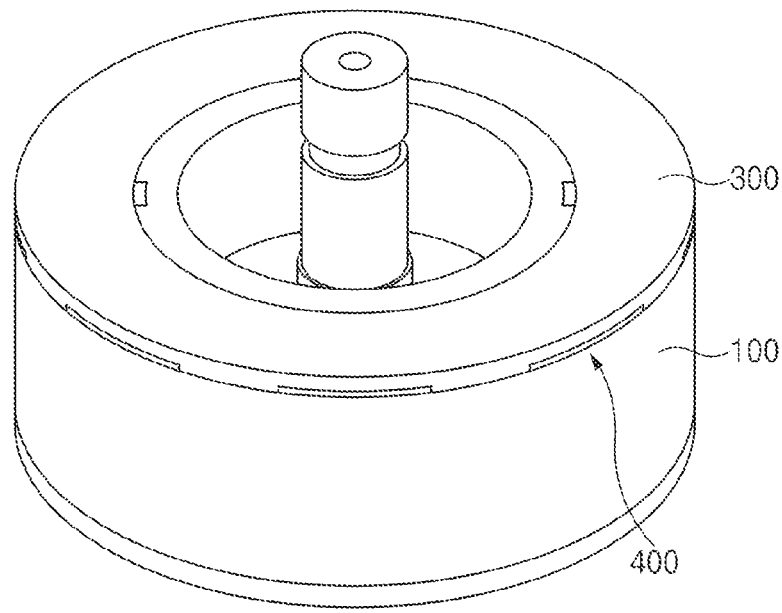
FIG. 1 is a view for explaining a rotor for a motor according to an embodiment of the present disclosure.
Figure 2:
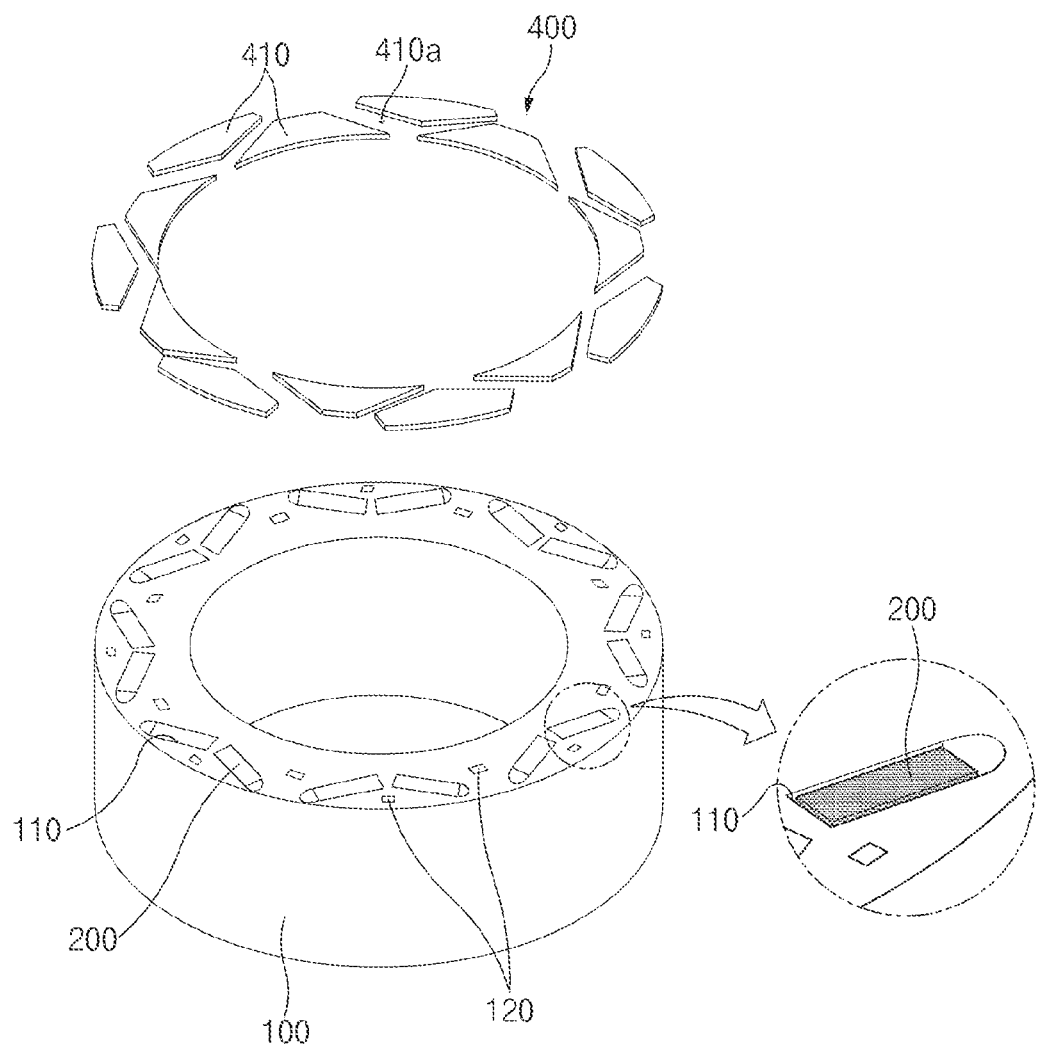
FIG. 2 is a view for explaining a soft magnetic core of the rotor for a motor according to the embodiment of the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 4, a rotor 10 for a motor according to an embodiment of the present disclosure includes: a rotor core 100 having accommodation holes 110 penetratively provided in an axial direction; permanent magnets 200 accommodated in the accommodation holes 110, respectively; endplates 300 configured to cover ends of the rotor core 100; and a soft magnetic core 400 provided on the endplate 300.

For reference, the rotor 10 for a motor according to the embodiment of the present disclosure may be mounted in various types of motors in accordance with required conditions and design specifications, and the present disclosure is not restricted or limited by the type and structure of the motor.

For example, the rotor 10 according to the embodiment of the present disclosure may be used as a rotor 10 for an interior permanent magnet (IPM) motor.

More specifically, the IPM motor may be an inner-rotor-type synchronous motor and include a stator (not illustrated) installed in a motor housing (not illustrated), and the rotor 10 rotatably installed in the stator with a predetermined air gap from the stator.

The stator may be accommodated in the motor housing, and a coil (not illustrated) configured to induce an electrical interaction between the stator and the rotor 10 is wound around the stator.

As an example, the stator may include a plurality of split cores (not illustrated) configured to cooperatively define a ring shape, and a support ring (not illustrated) configured to surround outer circumferential surfaces of the plurality of split cores.

The split core may be variously changed in number and structure in accordance with required conditions and design specifications, and the present disclosure is not restricted or limited by the number of split cores and the structure of the split core.

More specifically, the split core may be made by stacking a plurality of electrical steel sheets in an axial direction of the rotor 10.

A bobbin (not illustrated) (made of plastic, for example) is provided around the respective split cores, and a coil is wound around the bobbin. According to another exemplary embodiment of the present disclosure, the stator may include a single core.

The rotor 10 is provided to be rotated by the electrical interaction with the stator and includes the rotor core 100, the permanent magnets 200, the endplates 300, and the soft magnetic core 400.

The rotor core 100 may have a structure made by stacking a plurality of circular plates each provided in the form of a thin steel sheet (e.g., a silicon steel sheet). Alternately, the rotor core 100 may have a structure provided in the form of a single bin. However, the present disclosure is not restricted or limited by the structure and material of the rotor core 100.

A shaft hole (not illustrated) may be provided at a center of the rotor core 100, and a shaft (not illustrated) may be coupled to the shaft hole.

In addition, the accommodation holes 110 penetrate the rotor core 100 in the axial direction and accommodate the permanent magnets 200, respectively.

In particular, the plurality of accommodation holes 110 is spaced apart from one another at an equal interval in a circumferential direction of the rotor 10, and the number of accommodation holes 110 and the interval between the accommodation holes 110 may be variously changed in accordance with required conditions and design specifications.

The permanent magnets 200 are individually accommodated in the plurality of accommodation holes 110 provided in the rotor core 100.

The permanent magnet 200 may be variously sized and shaped so as to be accommodated in (inserted into) the accommodation hole 110, and the present disclosure is not restricted or limited by the size and shape of the permanent magnet 200. For example, the permanent magnet 200 may have a length (height) corresponding to an axial length of the rotor core 100.

The endplates 300 are provided to cover the ends of the rotor core 100. More specifically, the endplates 300 cover an upper end of the rotor core 100 and a lower end of the rotor core 100, respectively.

In this case, the configuration in which the endplates 300 cover the ends of the rotor core 100 means that the endplates 300 cover two opposite ends of each of the permanent magnets 200 accommodated in the rotor core 100.

For example, the endplate 300 may be provided in the form of a hollow ring-shaped plate having a small thickness and having a diameter corresponding to a diameter of the rotor core 100.

In particular, the endplate 300 may be made of a non-magnetic material such as stainless steel, and the present disclosure is not restricted or limited by the type and property of the non-magnetic material that constitutes the endplate 300.

Since the endplate 300 is made of a non-magnetic material as described above, it is possible to obtain an advantageous effect of minimizing the amount of magnetic flux leaking to the outside (into the air) from the ends of the permanent magnets 200 in the axial direction of the rotor core 100.

The soft magnetic core 400 is made of a soft magnetic material and provided on the endplate 300.

In the embodiment of the present disclosure, the configuration in which the soft magnetic core 400 is provided on the endplate 300 includes both a case in which the soft magnetic core 400 is stacked on an outer surface (e.g., an inner surface) of the endplate 300 and a case in which the soft magnetic core 400 is accommodated in the endplate 300.

Figure 4:
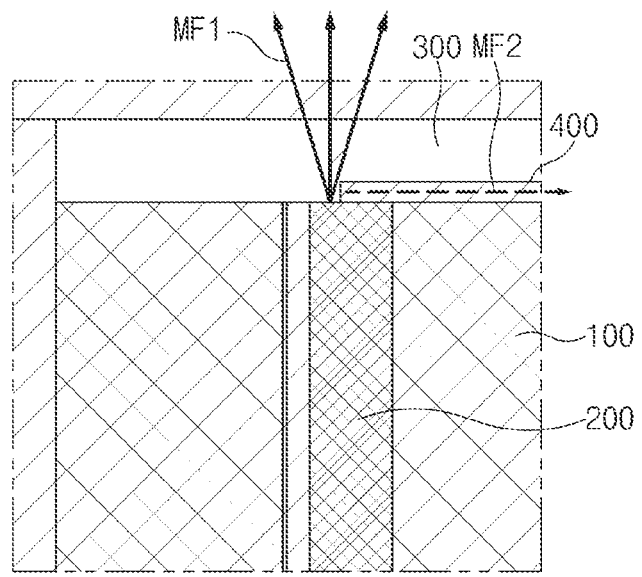
FIG. 4 is a view for explaining a path of magnetic flux leaking from an end of a permanent magnet of the rotor for a motor according to the embodiment of the present disclosure.

As described above, in the embodiment of the present disclosure, since the soft magnetic core 400 is provided on the endplate 300, a direction MF1 of a path (e.g., a vertical path) of the magnetic flux leaking from the end of the permanent magnet 200 may be switched to a direction MF2 of torque magnetic flux (a circumferential direction in which torque is generated), as illustrated in FIG. 4. In other words, a magnetic flux movement passage may be provided through the soft magnetic core 400. Therefore, it is possible to obtain an advantageous effect of further reducing the amount of magnetic flux leaking from the ends of the permanent magnets 200, improving the efficiency of the motor, and increasing the counter electromotive force of the motor.

For reference, the soft magnetic core 400 may be manufactured by filling a compression molding device with soft magnetic powder containing iron-based particles, and then compressing the soft magnetic powder with a compression member such as a punch. A lubricant and a coupling agent may be mixed with the soft magnetic powder. In particular, the soft magnetic powder may be coated so as to have electrical insulation.

The soft magnetic core 400 may be variously changed in structure and arrangement structure in accordance with required conditions and design specifications, and the present disclosure is not restricted or limited by the structure and arrangement structure of the soft magnetic core 400.

For example, referring to FIGS. 1 to 4, the soft magnetic core 400 may include a plurality of core pieces 410 disposed between the rotor core 100 and the endplate 300.

The core piece 410 may be variously changed in shape and number in accordance with required conditions and design specifications. For example, the plurality of core pieces 410 may include approximately trapezoidal core pieces 410 and approximately pentagonal core pieces 410. The plurality of core pieces 410 may be disposed to cooperatively cover the end of the rotor core 100.

According to the exemplary embodiment of the present disclosure, the plurality of core pieces 410 is disposed to be spaced apart from one another at predetermined gaps 410a, and the plurality of core pieces 410 is arranged to cooperatively define an approximately ring shape.

Since the plurality of core pieces 410 cooperatively defines a ring shape as described above, the direction MF1 of the path (e.g., a vertical path) of the magnetic flux leaking from the end of the permanent magnet 200 may be switched to the direction MF2 of the torque magnetic flux (the circumferential direction in which torque is generated) (see FIG. 4).

In particular, the permanent magnets 200 are partially exposed through the gaps 410a provided between the core pieces 410.

Since the permanent magnets 200 are exposed through the gaps 410a provided between the core pieces 410, as described above, the paths of the magnetic flux leaking from the ends of the permanent magnets 200 may be guided to the core pieces 410 disposed adjacent to the ends of the permanent magnets 200 through the gaps 410a. Therefore, it is possible to obtain an advantageous effect of more effectively reducing the amount of magnetic flux leaking from the ends of the permanent magnets 200, further improving the efficiency of the motor, and further increasing the counter electromotive force of the motor.

Moreover, since the gaps 410a are provided between the plurality of core pieces 410 constituting the soft magnetic core 400, the amount of soft magnetic powder required to manufacture the soft magnetic core 400 may be reduced. Therefore, it is possible to obtain an advantageous effect of reducing costs required to manufacture of the motor.

In more particular, the core piece 410 is disposed to cover at least a part of the accommodation hole 110 in which the permanent magnet 200 is accommodated.

Since the core piece 410 is disposed to cover at least a part of the accommodation hole 110 as described above, it is possible to obtain an advantageous effect of inhibiting the permanent magnet 200, accommodated in the accommodation hole 110, from being withdrawn to the outside.

Among other things, since the core pieces 410 perform both the function of switching the paths of the magnetic flux leaking from the ends of the permanent magnets 200 and the function of inhibiting the withdrawal of the permanent magnets 200, it is not necessary to provide a separate restriction member for preventing the withdrawal of the permanent magnets 200. Therefore, it is possible to obtain an advantageous effect of simplifying the structure of the rotor and reducing the number of components.

Figure 3:
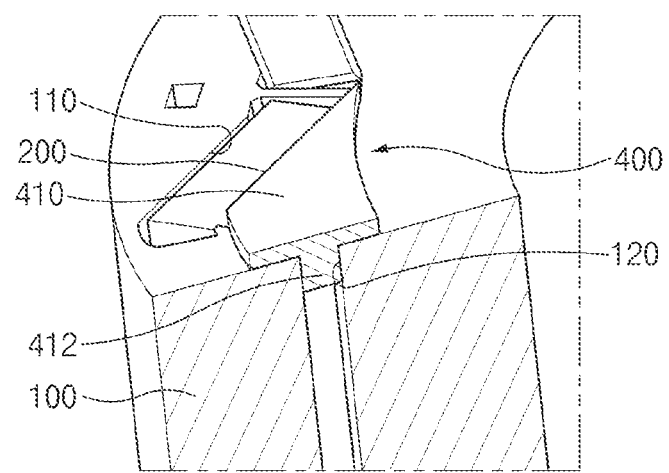
FIG. 3 is a view for explaining a coupling protrusion and a coupling groove of the rotor for a motor according to the embodiment of the present disclosure.

Referring to FIG. 3, according to the exemplary embodiment of the present disclosure, the rotor 10 for a motor may include coupling protrusions 412 provided on a bottom surface (based on FIG. 3) of the soft magnetic core 400 (e.g., provided on the core pieces), and coupling grooves 120 provided in an upper surface (based on FIG. 3) of the rotor core 100 and configured to accommodate the coupling protrusions 412.

Since the coupling protrusion 412 provided on the soft magnetic core 400 is accommodated in the coupling groove 120 provided in the rotor core 100, as described above, it is possible to obtain an advantageous effect of stably maintaining the arrangement state of the soft magnetic core 400.

The coupling protrusion 412 and the coupling groove 120 may be variously changed in shape and structure in accordance with required conditions and design specifications. In particular, the core pieces 410 each may have the coupling protrusion 412 individually.

In the embodiment of the present disclosure illustrated and described above, the example has been described in which the soft magnetic core 400 is coupled to the end of the rotor core 100 through the coupling protrusions 412 and the coupling grooves 120. However, according to another embodiment of the present disclosure, the soft magnetic core 400 may be coupled to the endplate 300.

Further, the parts identical and equivalent to the parts in the above-mentioned configuration will be designated by the identical or equivalent reference numerals, and detailed descriptions thereof will be omitted.

Figure 5:
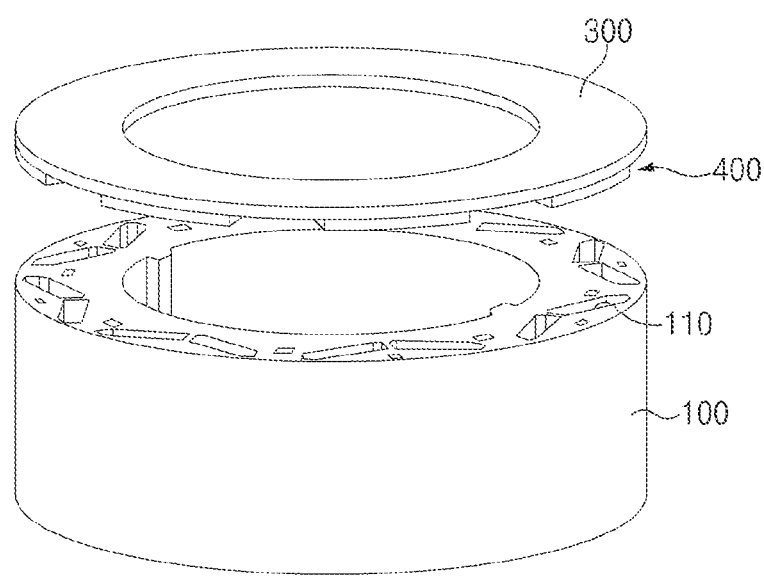
FIG. 5 is a view for explaining a rotor for a motor according to another embodiment of the present disclosure.
Figure 6:
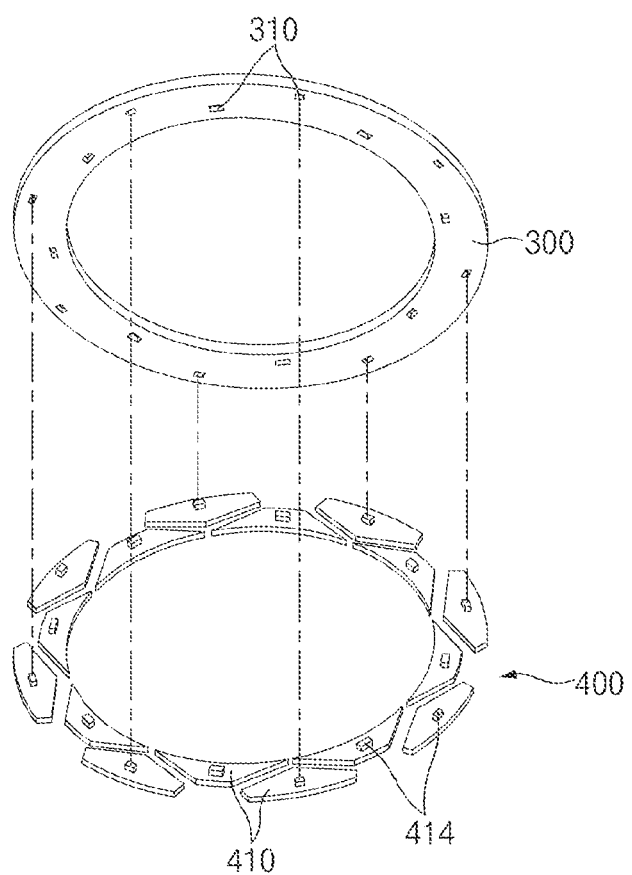
FIGS. 6 and 7 are views for explaining a fixing protrusion and a fixing groove of the rotor for a motor according to another embodiment of the present disclosure.
Figure 7:
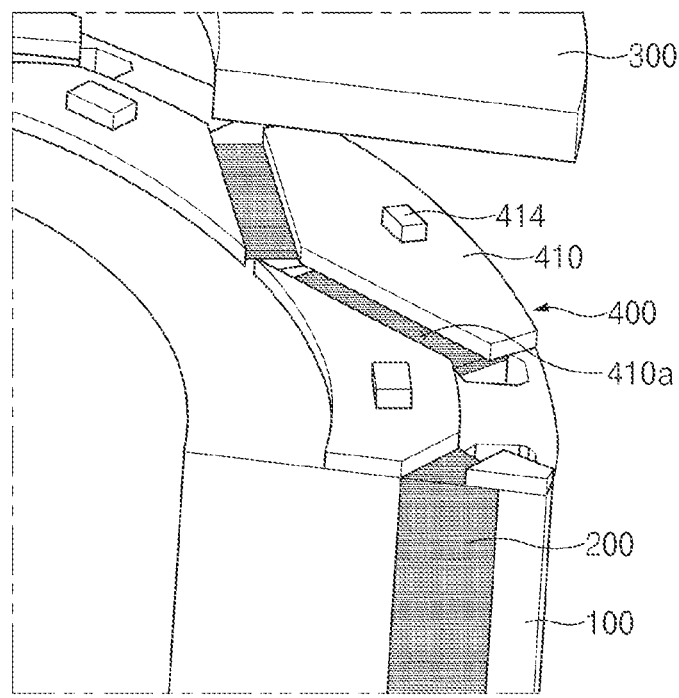

Referring to FIGS. 5 to 7, the rotor 10 for a motor may include the rotor core 100, the permanent magnets 200, the endplates 300, and the soft magnetic core 400. Fixing protrusions 414 may be provided on the bottom surface (based on FIG. 5) of the soft magnetic core 400, and fixing grooves 310 may be provided in an upper surface (based on FIG. 5) of the endplate 300 so as to accommodate the fixing protrusions 414.

Since the fixing protrusions 414 provided on the soft magnetic core 400 are accommodated in the fixing grooves 310 provided in the endplate 300 as described above, it is possible to obtain an advantageous effect of stably maintaining the arrangement state of the soft magnetic core 400.

The fixing protrusion 414 and the fixing groove 310 may be variously changed in shape and structure in accordance with required conditions and design specifications. In particular, the core pieces 410 each may have the fixing protrusion 414 individually.

For reference, the soft magnetic core 400 may be fixed to the rotor core 100 as the endplate 300 is coupled to the rotor core 100, and the present disclosure is not restricted or limited by the coupling structure between the end plate 300 and the rotor core 100.

In the embodiment of the present disclosure illustrated and described above, the example has been described in which the soft magnetic core 400 protrudes from the one surface of the endplate 300. However, according to another embodiment of the present disclosure, the soft magnetic core 400 may be accommodated in the endplate 300.

Further, the parts identical and equivalent to the parts in the above-mentioned configuration will be designated by the identical or equivalent reference numerals, and detailed descriptions thereof will be omitted.

Figure 8:
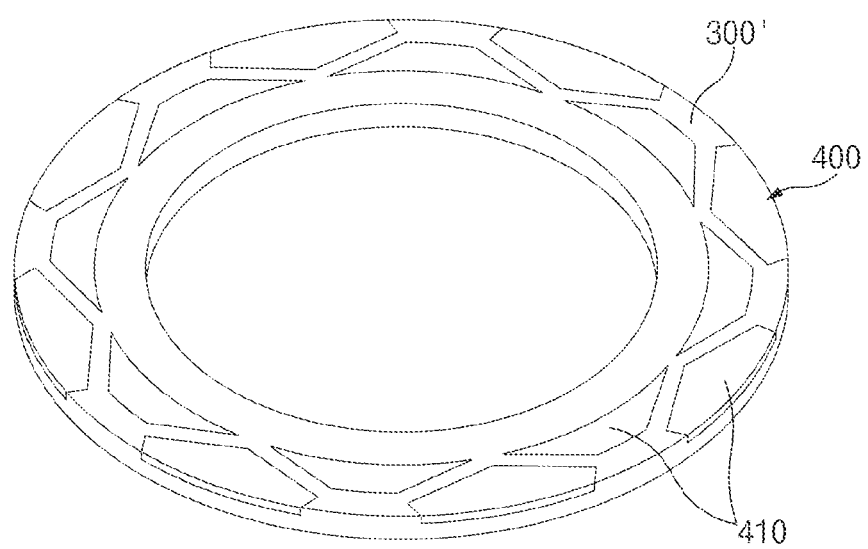
FIGS. 8 and 9 are views for explaining a modified example of an endplate of the rotor for a motor according to the embodiment of the present disclosure.
Figure 9:
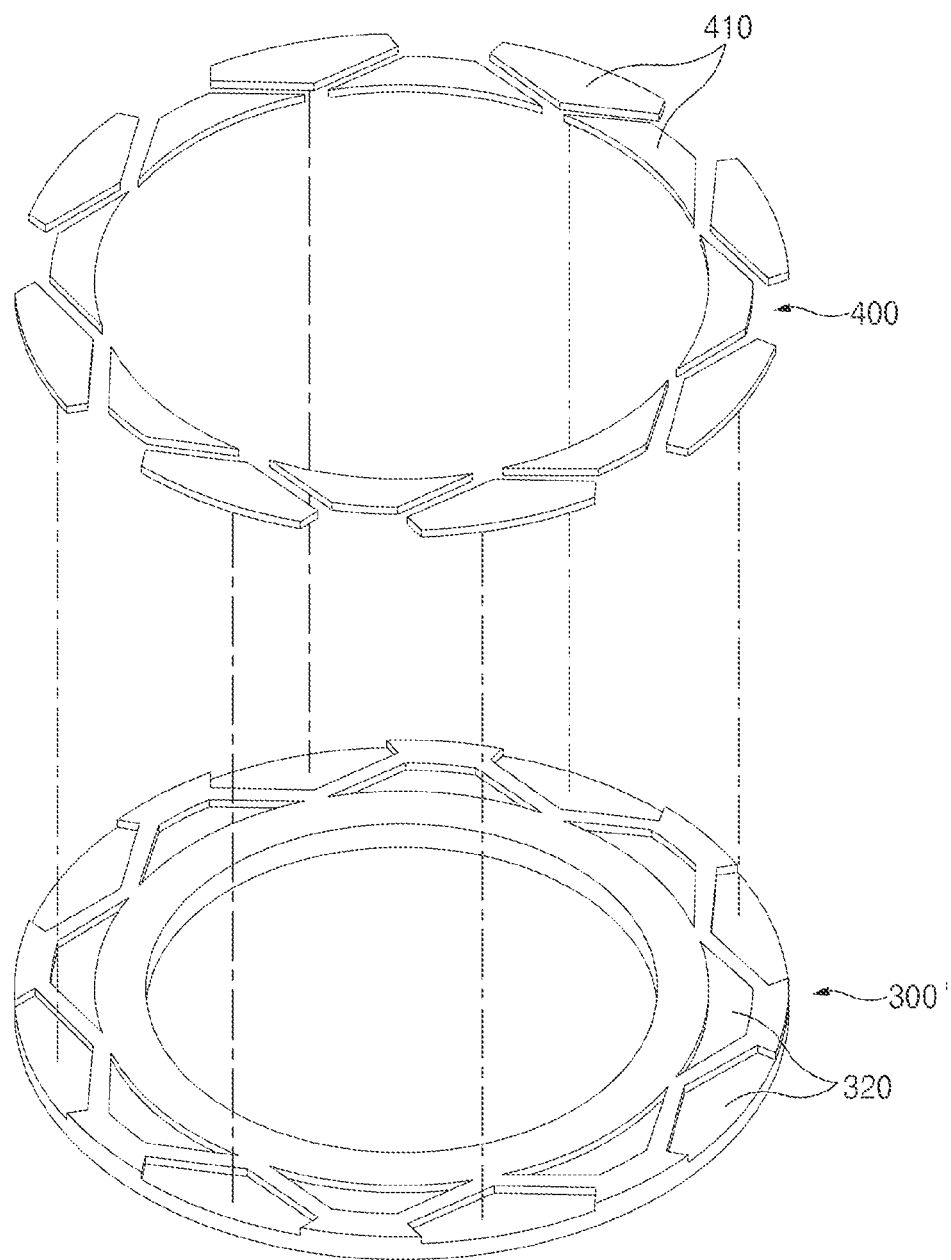

Referring to FIGS. 8 and 9, the rotor 10 for a motor according to another embodiment of the present disclosure may include the rotor core 100, the permanent magnets 200, an endplate 300', and the soft magnetic core 400 (the plurality of core pieces). Accommodation grooves 320 may be provided in an inner surface of the endplate 300' that faces the rotor core 100, and the soft magnetic core 400 may be accommodated in the accommodation grooves 320.

In particular, in a state in which the soft magnetic core 400 (the plurality of core pieces) is accommodated in the accommodation grooves 320, the inner surface (the upper surface based on FIG. 8) of the soft magnetic core 400 may be disposed on the same plane as the inner surface (the upper surface based on FIG. 8) of the endplate 300'.

The accommodation groove 320 may have a shape and a size corresponding to those of the soft magnetic core 400 (e.g., the core piece), and the present disclosure is not restricted or limited by the shape and size of the accommodation groove 320. Alternately, the soft magnetic core may be accommodated in the accommodation groove that has a different shape and a different size from the core piece (or has a larger size than the core piece).

Meanwhile, in the embodiment of the present disclosure illustrated and described above, the example has been described in which the soft magnetic core 400 includes the plurality of core pieces 410. However, according to another embodiment of the present disclosure, the soft magnetic core 400 may be provided as a single member.

Further, the parts identical and equivalent to the parts in the above-mentioned configuration will be designated by the identical or equivalent reference numerals, and detailed descriptions thereof will be omitted.

Figure 10:
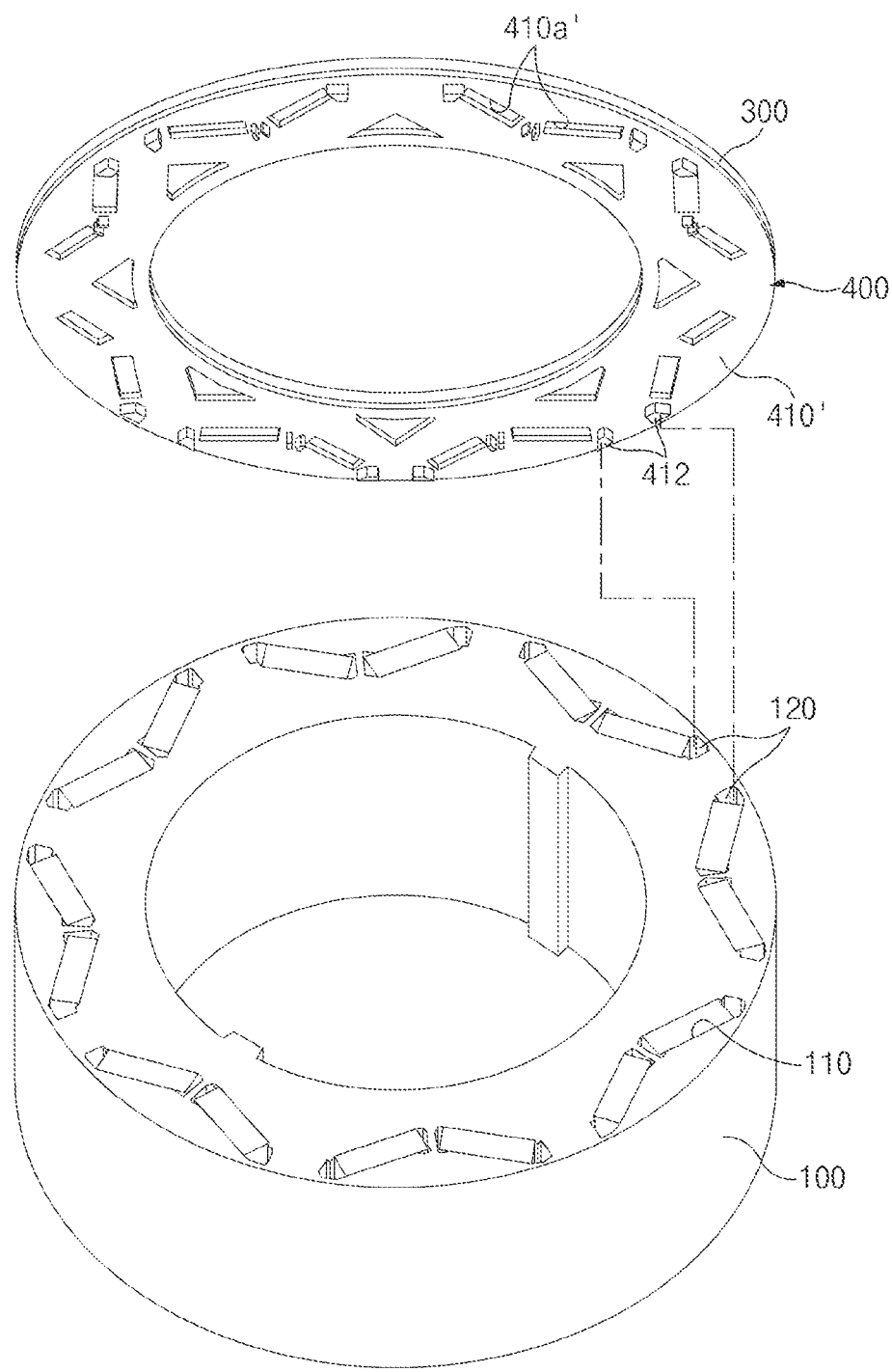
FIG. 10 is a view for explaining a modified example of the soft magnetic core of the rotor for a motor according to the embodiment of the present disclosure.

Referring to FIG. 10, the rotor 10 for a motor may include the rotor core 100, the permanent magnets 200, the endplate 300, and the soft magnetic core 400. The soft magnetic core 400 may include a single core plate 410' disposed between the rotor core 100 and the endplate 300.

For example, the core plate 410' may be provided in the form of a hollow ring-shaped plate having a small thickness and having a diameter corresponding to a diameter of the rotor core 100.

Since the core plate 410' is provided in the form of a ring as described above, the direction MF1 of the path (e.g., a vertical path) of the magnetic flux leaking from the end of the permanent magnet 200 may be switched to the direction MF2 of the torque magnetic flux (the circumferential direction in which torque is generated) (see FIG. 4).

In particular, the core plate 410' may have a plurality of exposure holes 410a' through which the magnets are exposed.

Since the permanent magnets 200 are exposed through the exposure holes 410a' provided in the core plate 410', as described above, the paths of the magnetic flux leaking from the ends of the permanent magnets 200 may be more effectively guided to the core plate 410' through the exposure holes 410a'. Therefore, it is possible to obtain an advantageous effect of more effectively reducing the amount of magnetic flux leaking from the ends of the permanent magnets 200, further improving the efficiency of the motor, and further increasing the counter electromotive force of the motor.

Moreover, since the exposure holes 410a' are provided in the core plate 410', the amount of soft magnetic powder required to manufacture the core plate 410' may be reduced. Therefore, it is possible to obtain an advantageous effect of reducing the costs required to manufacture the motor.

In more particular, the core plate 410' covers the accommodation holes 110 at least partially. Since the core plate 410' is disposed to cover the accommodation holes 110 at least partially as described above, it is possible to obtain an advantageous effect of inhibiting the permanent magnets 200, accommodated in the accommodation holes 110, from being withdrawn to the outside while switching the paths of the magnetic flux leaking from the ends of the permanent magnets 200.

In addition, in the embodiment of the present disclosure illustrated and described above, the example has been described in which the soft magnetic core 400 and the endplate 300 are disposed on the different layers. However, according to another embodiment of the present disclosure, the soft magnetic core 400 and the endplate 300 may be disposed on the same layer.

Further, the parts identical and equivalent to the parts in the above-mentioned configuration will be designated by the identical or equivalent reference numerals, and detailed descriptions thereof will be omitted.

Figure 11:
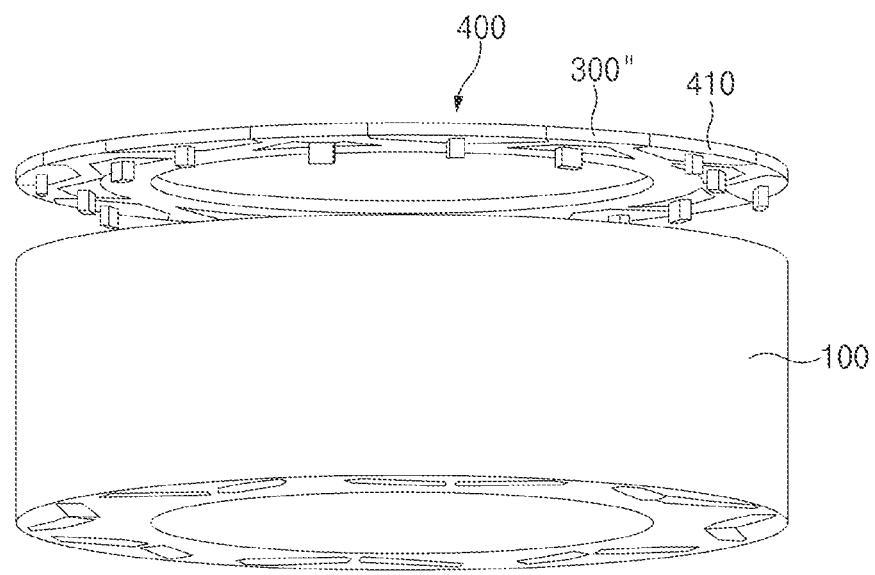
FIGS. 11 and 12 are views for explaining another modified example of the endplate of the rotor for a motor according to the embodiment of the present disclosure.
Figure 12:
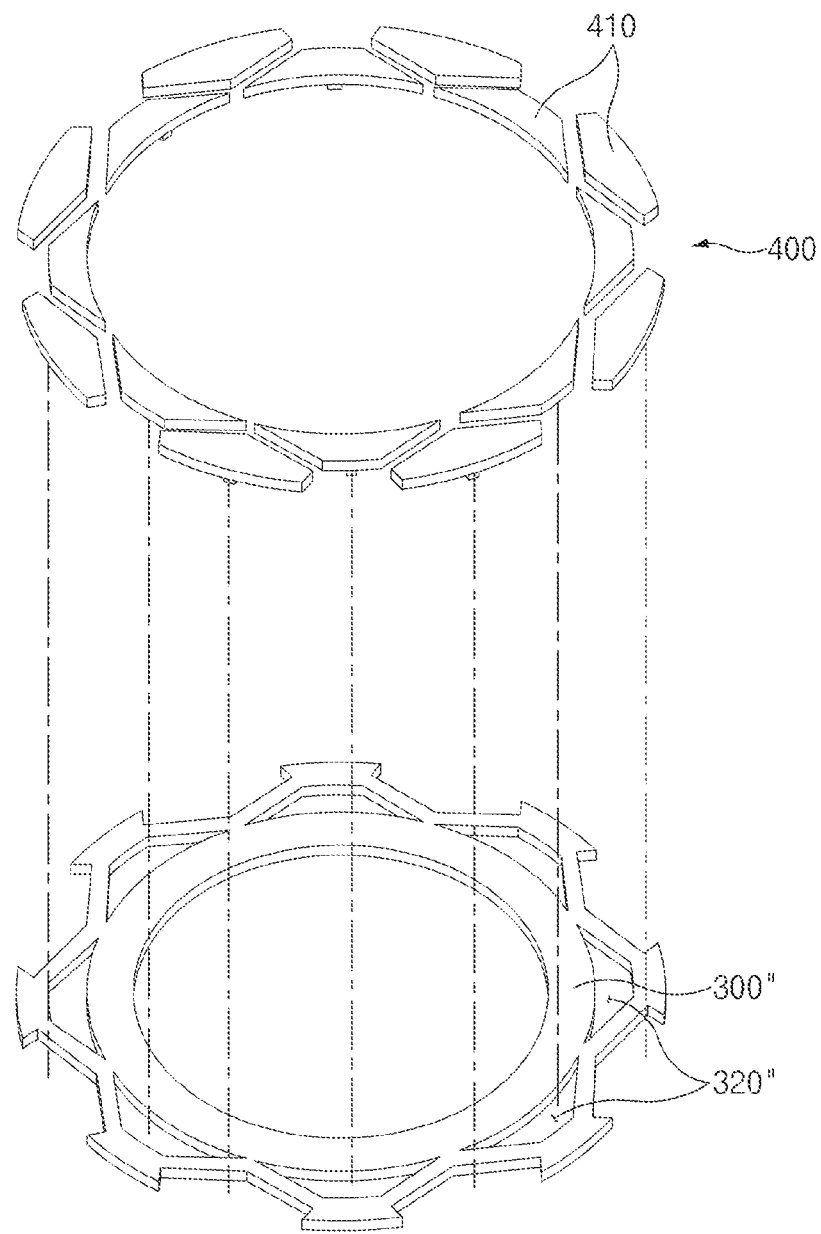

Referring to FIGS. 11 and 12, the rotor 10 for a motor may include the rotor core 100, the permanent magnets 200, an endplate 300", and the soft magnetic core 400 (the plurality of core pieces). Through-holes 320" may be provided in the endplate 300", and the soft magnetic core 400 may be accommodated in the through-holes 320" so as to be disposed on the same layer as the endplate 300".

For example, the endplate 300" and the soft magnetic core 400 (the plurality of core pieces) may be integrated by insert-injection molding. According to another embodiment of the present disclosure, the soft magnetic core may be assembled with the endplate through the through-holes.

In particular, the inner surface (the bottom surface based on FIG. 11) of the soft magnetic core 400 may be disposed on the same plane as the inner surface (the bottom surface based on FIG. 8) of the endplate 300". The outer surface (the upper surface based on FIG. 11) of the soft magnetic core 400 may be disposed on the same plane as the outer surface (the upper surface based on FIG. 11) of the endplate 300".

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A rotor for a motor, the rotor comprising:
   a rotor core including accommodation holes formed in a closed shape within the rotor core in an axial direction;
   permanent magnets respectively accommodated in the accommodation holes;
   an endplate configured to cover an end of the rotor core; and
   a soft magnetic core comprising core pieces disposed on the endplate,
   wherein the core pieces define a ring shape and are respectively positioned at the end of the rotor, adjacent the permanent magnets, and
   wherein the core pieces redirect magnetic flux leaking in the axial direction from the permanent magnets to a circumferential direction in which torque may be generated by the motor.

2. The rotor of claim 1, wherein the soft magnetic core is disposed between the rotor core and the endplate.

3. The rotor of claim 2, wherein the soft magnetic core comprises a single core plate disposed between the rotor core and the endplate.

4. The rotor of claim 3, wherein the core plate has a ring shape corresponding to the rotor core.

5. The rotor of claim 3, wherein the core plate includes exposure holes through which the permanent magnets are exposed.

6. The rotor of claim 3, wherein the core plate at least partially covers the accommodation holes.

7. The rotor of claim 2, wherein the core pieces are disposed between the rotor core and the endplate.

8. The rotor of claim 7, wherein the core pieces are disposed to be spaced apart from one another and cooperatively define a ring shape corresponding to the rotor core.

9. The rotor of claim 8, wherein the permanent magnets are exposed through gaps formed between the plurality of core pieces.

10. The rotor of claim 7, wherein the core pieces at least partially cover the accommodation holes.

11. The rotor of claim 1, further comprising:
    a coupling protrusion disposed on the soft magnetic core; and
    a coupling groove disposed in the rotor core and configured to accommodate the coupling protrusion.

12. The rotor of claim 1, further comprising:
    a fixing protrusion disposed on the soft magnetic core; and
    a fixing groove disposed in the endplate and configured to accommodate the fixing protrusion.

13. The rotor of claim 1, wherein an accommodation groove is disposed in an inner surface of the endplate that faces the rotor core, and the soft magnetic core is accommodated in the accommodation groove.

14. The rotor of claim 1, wherein a through-hole is disposed in the endplate, and the soft magnetic core is accommodated in the through-hole so as to be disposed on a same layer as the endplate.

15. The rotor of claim 1, wherein the endplate is made of a non-magnetic material.

16. The rotor of claim 1,
    wherein the core pieces are respectively accommodated in a plurality accommodation grooves disposed in an inner surface of the endplate that faces the rotor core, and
    wherein shapes and sizes of the plurality of accommodation grooves respectively correspond to shapes and sizes of the plurality of core pieces.

17. The rotor of claim 1, wherein the accommodation holes penetrate the rotor core and are covered by an outer side surface of the rotor core.

18. The rotor of claim 1, wherein the outer portion of the rotor core forms a closed cylindrical surface.

19. The rotor of claim 1, wherein the permanent magnets are surrounded by the accommodation holes.

* * * * *